Figure 1:
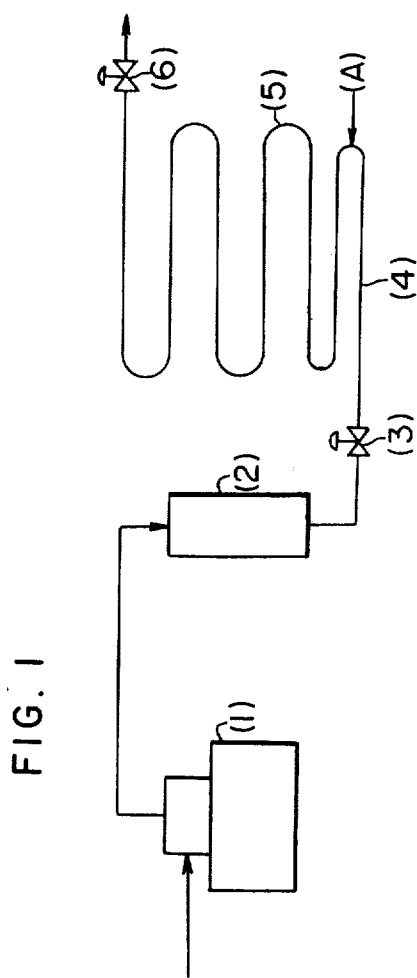

United States Patent [19]

Morikawa et al.

[11] 3,875,134

[45] Apr. 1, 1975

[54] PROCESS FOR PRODUCING ETHYLENE POLYMER UNDER HIGH PRESSURE

[75] Inventors: Minoru Morikawa, Chiba; Ryuichi Sonoda; Kiyoshi Matsuyama, both of Niihama, all of Japan

[73] Assignee: Sumitomo Chemical Company, Limited, Osaka, Japan

[22] Filed: May 7, 1973

[21] Appl. No.: 357,659

[52] U.S. Cl............ 260/94.9 R, 23/290, 260/63 R, 260/85.7, 260/86.7, 260/88.1 R, 260/88.1 PN, 260/88.2 R, 260/88.2 C, 260/94.9 P
[51] Int. Cl.............................. C08f 1/60, C08f 3/04
[58] Field of Search......... 260/94.9 R, 94.9 P, 63 R, 260/85.7, 86.7, 88.1 R, 88.1 PN, 88.2 R, 88.2 C; 23/290

[56] References Cited
UNITED STATES PATENTS

| | | | |
|---|---|---|---|
| 3,536,693 | 10/1970 | Schrader et al.................. | 260/94.9 |
| 3,691,145 | 9/1972 | Gierth et al....................... | 260/94.9 |
| 3,692,763 | 9/1972 | Saane et al. ..................... | 260/94.9 |
| 3,702,845 | 11/1972 | Steigerwald et al. ............. | 260/94.9 |
| 3,719,643 | 3/1973 | Knight .............................. | 260/87.3 |

*Primary Examiner*—Lester L. Lee
*Attorney, Agent, or Firm*—Stevens, Davis, Miller & Mosher

[57] ABSTRACT

Polymerization or copolymerization of ethylene under high pressure is carried out first in an autoclave reactor and the reaction mixture as such, without having been freed of the polymer, is then introduced into the succeeding tubular reactor(s) to continue the polymerization, thus easily resulting in a marked increase in conversion. The resulting polymer is free from gel-forming materials and is improved in processibility.

10 Claims, 1 Drawing Figure

PROCESS FOR PRODUCING ETHYLENE POLYMER UNDER HIGH PRESSURE

This invention relates to a process for producing an ethylene polymer or copolymer under a high pressure (hereinafter an ethylene polymer and a copolymer of ethylene as the major component are collectively referred to as "ethylene polymer").

The accompanying drawing shows a flow chart of one embodiment of this invention. In FIG. 1, (1) represents a high pressure gas compressor, (2) an autoclave reactor, (3) and (6) pressure regulating values, (4) a heat exchanger, (5) a tubular reactor, and (A) an inlet for a catalyst.

An object of this invention is to provide a method for improving the conversion in ethylene polymerization (copolymerization) under a high pressure. The conversion, as herein referred to, means the weight percentage of the polymer being formed per unit weight of gaseous raw material(s) which has been fed.

Another object of this invention is to provide a process for producing an ethylene polymer having characteristic properties of molecular weight and molecular weight distribution, which are controlled in a broader range.

Still another object of this invention is to provide an apparatus for polymerization or copolymerization of ethylene, which comprises an autoclave reactor and a tubular reactor connected to each other.

Other objects and advantages will be apparent from the following description.

A high-pressure process polyethylene is produced generally under such conditions as a reaction pressure of 500 to 4,000 kg/cm² and a reaction temperature of 150 to 300°C in the presence of oxygen or various peroxides as catalyst. The polymerization mixture from the reactor is released of pressure until a pressure of 50 to 600 kg/cm² is reached, whereby the mixture is separated into a polymerizate and the unreacted gaseous material.

There are two types of reactors in use for the production of a high-pressure process polyethylene — that is, an autoclave reactor and a tubular reactor. The autoclave reactor is a reactor in substantially cylindrical or nearly cylindrical form of a relatively large diameter, the ratio of length to diameter being generally 5 to 20, and usually provided with a means for stirring. The tubular reactor is a reactor in substantially cylindrical form of a relatively small diameter, the ratio of length to diameter being generally 300 to 40,000 or thereabout.

These two types of reactors have their respective advantages and disadvantages. For example, the autoclave reactor requires no preheating of the ethylene feed, while molecular weight distribution of the polymer being formed is relatively narrow. On the other hand, the tubular reactor may produce a polymer with relatively broad molecular weight distribution, while it is not suited for copolymerization and it requires preheating of the ethylene feed.

Such necessary preheating sometimes brings about build-up of a high molecular weight polymer or, in some cases, of a crosslinked polymer on the wall of a reactor tube in the preheating zone or high temperature zone, which likely leads to such undesirable phenomena as blocking of the tube or reduction in the heat transfer coefficient. These high molecular weight polymers and crosslinked polymers may contaminate the product polymer and cause deterioration in optical and other properties of end products, such as formation of fisheye (an insufficiently fused blobular mass in the film, something like a tiny lens).

The conversion per pass through these reactors is ordinarily about 10 to 20% by weight. In order to increase the conversion of ethylene in the polymerization reaction, the heat of reaction evolved in the course of reaction must be removed out of the reaction system.

In an autoclave reactor, the heat of polymerization is removed chiefly by utilizing sensible heat of the cold ethylene itself which is fed as a starting material.

On the other hand, in a tubular reactor the heat of polymerization has been removed by cooling externally the reactor tube, by feeding a portion of the cold ethylene feed as a starting material to a high temperature zone (Japanese Patent Publication No. 18,984/63), or by feeding a catalyst at two or more positions on a reactor tube (Japanese Patent Publication No. 4,686/63).

In any way, however, in a tubular reactor it is not possible to utilize to full extent the sensible heat required for elevating the temperature of the ethylene feed in removing the heat of polymerization, as is the case with an autoclave reactor, because at least a part of the gaseous raw material must be preheated in order to initiate polymerization.

According to this invention, the aforesaid disadvantages of the autoclave reactor and the tubular reactor may be compensated and advantages of both reactors may be fully utilized.

No attempt has heretofore been made to carry out polymerization of ethylene in an autoclave reactor and then, without having been removed of the polymer, the polymerization mixture as such is introduced into a tubular reactor to continue the polymerization, because blocking of the reactor or occurrence of various other difficulties were deemed probable. It has been quite surprising that polymerization (copolymerization) of ethylene can be carried out without any trouble by means of an autoclave reactor and a tubular reactor connected in series according to this invention.

According to this invention, an ethylene polymer is produced by first polymerizing a compressed ethylene gas in an autoclave reactor while fully utilizing sensible heat of the cold ethylene for removing the heat of polymerization, and then introducing the polymerization mixture into a tubular reactor to continue the polymerization while removing the heat of polymerization by external cooling.

According to this invention, the conversion of ethylene may be considerably improved as compared with the case where single autoclave reactor or single tubular reactor is used. Further, according to this invention it is possible to avoid deterioration in product quality due to contamination with a high molecular weight polymer and a crosslinked polymer formed in a preheating zone or a high temperature zone when a single tubular reactor is used. In a conventional process, in which single tubular reactor was used, a p-tert-alkylphenol aldehyde (U.S. Pat. No. 3,157,627) or butene was added in order to avoid gel formation due to a high molecular weight polymer and a crosslinked polymer. According to this invention, gel formation can be avoided without resorting to such secondary means.

An outline of this invention is illustrated below with reference to FIG. 1.

An ethylene gas compressed by a high-pressure gas compressor (1) is introduced into an autoclave reactor (2) and with the addition of a catalyst allowed to undergo polymerization in a customary manner. The mixture of ethylene and an ethylene polymer (ordinarily containing 10 to 20% by weight of an ethylene polymer) as such or after being reduced in pressure by means of a pressure regulating valve (3) is sent to a tubular heat exchanger (4). In the heat exchanger, depending upon the reaction conditions, the mixture is cooled or heated or neither cooled nor heated. The mixture is then introduced into a succeeding tubular reactor (5) to continue the polymerization with the addition of a fresh catalyst from (A). Two or more tubular reactors connected in series can be used. Whether the reaction mixture from the autoclave reactor is cooled or heated or neither cooled nor heated in the heat exchanger is determined according to the following criteria.

The reaction mixture is cooled when it is intended to introduce the mixture at a temperature lower than that at the exit of the autoclave reactor into the tubular reactor. To the contrary, the mixture is heated when it is intended to introduce the mixture at a temperature higher than that at the exit of the autoclave reactor into the tubular reactor. Cooling in the heat exchanger is most frequently used.

The catalysts for use in the process of this invention are well-known oxygen, various organic peroxides, azo compounds and the like. These catalysts are used each alone or in mixtures of two or more. Examples of individual catalysts include dialkyl peroxides, such as for example, di-t-butyl peroxide, diethyl peroxide, and the like; t-alkyl percarboxylates, such as for example, t-butyl perbenzoate, t-butyl peracetate, and the like; ketone peroxides such as for example, methyl ethyl ketone peroxide and the like; alkyl hydroperoxides, such as for example, t-butyl hydroperoxide and the like; acyl peroxides, such as for example, acetyl peroxide, benzoyl peroxide and the like; dicarboxylates, such as for example, diisopropyl peroxydicarbonate and the like; organic peroxides, such as for example, succinic acid peroxide and the like; oximes, such as for example, acetoneoxime and the like; azines, such as for example, benzylidene azine and the like; and azo compounds, such as for example, azobis(isobutyronitrile), 2,2'-azobis(methylisobutyrate), 2,2'-azobis(isobutylamide) and the like. The amount of the catalyst to be used is 5 to 3,000 parts by weight for 1,000,000 parts by weight of the ethylene or a mixture of ethylene and other monomers being fed.

Introduction of the catalyst into the tubular reactor may be carried out at one or two points along the reactor tube.

It is desirable to operate the process so that the linear velocity of the fluid reaction mixture in the heat exchanger (4) and tubular reactor (5) may become 5 to 35 m/sec.

The conversion may easily reach 20% by weight or higher by the addition of the conversion in the tubular reactor to that in the autoclave reactor. By selecting more favorable operation conditions, the conversion may easily be further increased to 25 to 35% by weight.

The reaction pressures in the autoclave reactor and the tubular reactor are ordinarily controlled simultaneously or, if necessary, may be controlled independently to each other by providing regulating valves at exits of each of the autoclave reactor and the tubular reactor. It is also possible to use a method which is the same as or similar to the method of producing pulsed flow of a fluid reaction mixture (Japanese Patent Publication No. 693/61) by use of an intermittent delivery valve designed to prevent blocking of a tubular reactor with a polymer. Thus, it is possible to produce pulsed flow of the fluid reaction mixture by controlling the pressures in the autoclave reactor and in the tubular reactor independently to each other, and providing an intermittent delivery valve at the exit of the tubular reactor. It is also possible to produce pulsed flow in the tubular reactor so as not to adversely affect the temperature control in the autoclave reactor. The reaction pressure in this invention is 1,000 to 4,000 kg/cm², preferably 1,200 to 3,000 kg/cm².

The reaction temperature may be controlled in the autoclave reactor and in the tubular reactor independently so that various temperature conditions may be established in the reactors. The polymerization temperature in this invention is 120° to 350°C, preferably 150° to 300°C.

According to this invention, not only the conversion is improved, but also molecular weight, molecular weight distribution, etc., of the polymer may be controlled by proper selection of reaction conditions; and hence characteristic properties of the polymer may be varied in broader range as compared with those of the polymer obtained by the conventional polymerization process.

The process of this invention is applicable not only to homopolymerization of ethylene, but also to copolymerization of ethylene with other copolymerizable comonomers. Comonomers to be used in copolymerization are vinyl ester compounds, such as for example, vinyl acetate, vinyl formate, vinyl butylate, and the like; acrylate and methacrylate compounds, such as for example, methyl acrylate, ethyl acrylate, methyl methacrylate, ethyl methacrylate and the like; acrylamide and methacrylamide compounds, such as for example, methyl acrylamide, ethyl acrylamide, methyl methacrylamide, ethyl methacrylamide and the like; vinyl ether compounds, such as for example, methyl vinyl ether, t-butyl vinyl ether, and the like; vinyl ketone compounds, such as for example, methyl vinyl ketone and the like; dicarbonate compounds, such as for example, diethyl fumarate, diethyl maleate and the like; acid anhydride, such as for example, maleic anhydride and the like; and styrene and the like.

The invention is illustrated below with reference to Examples, but the scope of the invention is not limited to the Examples.

EXAMPLE 1

One million parts per hour of ethylene is compressed to 2,000 kg/cm² in an ordinary way and fed at 40°C through a cooler into an autoclave reactor. At the same time, 6 parts per hour of di-tert-butyl peroxide is introduced into the autoclave reactor to initiate polymerization at a reaction temperature of 250°C. In the autoclave reactor 170,000 parts per hour of ethylene is converted into polyethylene. The reaction mixture is released of the pressure by means of a valve (3) to 1,500 kg/cm² and led through a heat exchanger (4) where the mixture is cooled to 200°C. The mixture is then introduced into a tubular reactor to continue the reaction while being admixed with 75 parts of a mixture of tert-butyl peroxide and tert-butyl perbenzoate as catalyst for the ethylene feed. The reaction temperature rises to a maximum temperature of 270°C. In the tubular reactor 80,000 parts per hour of ethylene is polymerized. The reaction mixture from the tubular reactor is released of pressure in a separator and separated into the polymer and the unreacted ethylene which is recycled for reuse.

In the above-mentioned manner, 250,000 parts per hour of polyethylene having a density (JIS K 6760-1960) of 0.918–0.922, and a melt index (JIS K 6760-1960) of 2–4 are obtained.

The conversion in single autoclave reactor was 170,000 parts per hour. By connecting the autoclave reactor to a tubular reactor, the conversion has been increased to 250,000 parts per hour.

The polymer obtained was improved in processibility and free from fisheye and other gel-forming substances.

EXAMPLE 2

One million parts per hour of ethylene is compressed to 2,500 kg/cm$^2$ in an ordinary way and fed at 40°C into an autoclave reactor through a cooler. At the same time, 4 parts per hour of di-tert-butyl peroxide is introduced into the reactor as catalyst to initiate polymerization at a reaction temperature of 250°C. In the autoclave reactor 170,000 parts per hour of ethylene is converted into polyethylene. The reaction mixture is cooled to 200°C by passing through a heat exchanger and introduced into a tubular reactor to continue the reaction while being admixed with 50 parts of a mixture of di-tert-butyl peroxide and tert-butyl perbenzoate as catalyst for the ethylene which has been fed. The reaction temperature rises to 270°C and 80,000 parts per hour of ethylene is polymerized in the tubular reactor. The reaction mixture is cooled to 200°C and fed to the succeeding tubular reactor to continue reaction while being admixed with 40 parts of a mixture of di-tert-butyl peroxide and tert-butyl perbenzoate as catalyst. The maximum reaction temperature reaches 255°C and 60,000 parts per hour of ethylene is polymerized in this tubular reactor. The reaction mixture from the tubular reactor is released of pressure in a separator to separate into a polymer and the unreacted ethylene gas which is recycled for reuse.

In the above-mentioned manner, there are obtained 310,000 parts per hour of polyethylene having a density of 0.92 to 0.924 and a melt index of 1 to 4. The conversion has risen from 170,000 parts per hour for an autoclave reactor alone to 310,000 parts per hour by connecting the autoclave reactor to two tubular reactors in series.

The polymer obtained was excellent in processibility and free from fisheye and other gel-forming substances.

What is claimed is:

1. A process for producing an ethylene polymer under a high pressure, which comprises first feeding compressed ethylene or a compressed mixture of ethylene and comonomers copolymerizable with ethylene into an autoclave reactor, polymerizing said ethylene or said mixture of ethylene and comonomers under a pressure of 1,000 to 4,000 Kg/cm$^2$ at a temperature of 120° to 350°C by addition of 5 to 3,000 parts by weight of a catalyst for 1,000,000 parts by weight of the ethylene or a mixture of ethylene and comonomer, passing the reaction mixture through a heat exchanger, then introducing the reaction mixture into a tubular reactor, and further polymerizing ethylene or copolymerizing a mixture of ethylene and comonomers copolymerizable with ethylene under a pressure of 1,000 to 4,000 Kg/cm$^2$ at a temperature of 120° to 350°C by further addition of 5 to 3,000 parts by weight of a catalyst for 1,000,000 parts by weight of the ethylene or a mixture of ethylene and comonomer.

2. A process according to claim 1, wherein linear velocity of the reaction mixture in the tubular reactor is 5 to 35 meters per second.

3. A process according to claim 1, wherein the polymerization is carried out under a pressure of 1,200 to 3,000 kg/cm$^2$.

4. A process according to claim 1, wherein the polymerization is carried out at a temperature of 150° to 300°C.

5. A process according to claim 1, wherein the comonomer copolymerizable with ethylene is a member selected from the group consisting of vinyl acetate, vinyl formate, vinyl butylate, methyl methacrylate, ethyl methacrylate, methyl acrylate, ethyl acrylate, acrylamide, methacrylamide, methylvinyl ether, t-butyl vinyl ether, methyl vinyl ketone, maleic anhydride and styrene.

6. A process according to claim 1, wherein the catalyst is at least one member selected from the group consisting of oxygen, di-t-butyl peroxide, diethyl peroxide, t-butyl perbenzoate, t-butyl peracetate, methyl ethyl ketone peroxide, t-butyl hydro peroxide, acetyl peroxide, benzoyl peroxide, di-isopropyl peroxydicarbonate, succinic acid peroxide, acetone oxime, benzylidene azine, azobis(isobutyronitrile), 2,2'-azobis(methylisobutylate) and 2,2'-azobis(isobutylamide).

7. A process according to claim 1, wherein the pressure of polymerization reaction is regulated simultaneously in the autoclave reactor and the tubular reactor.

8. A process according to claim 1, wherein the pressure of polymerization reaction is regulated in the autoclave reactor and the tubular reactor independently to each other.

9. A process according to claim 1, wherein introduction of the catalyst into the tubular reactor is conducted at one or more points along the reactor tube.

10. A process according to claim 1 wherein ethylene is fed into said autoclave reactor and homopolymerized in said process.

* * * * *